United States Patent
Tsuchida et al.

(10) Patent No.: US 12,335,376 B2
(45) Date of Patent: Jun. 17, 2025

(54) SECURE COMPUTATION SYSTEM, SECURE COMPUTATION SERVER APPARATUS, SECURE COMPUTATION METHOD, AND SECURE COMPUTATION PROGRAM

(71) Applicants: NEC CORPORATION, Tokyo (JP); UNIVERSITY OF TSUKUBA, Tsukuba (JP)

(72) Inventors: Hikaru Tsuchida, Tokyo (JP); Takashi Nishide, Ibaraki (JP)

(73) Assignees: NEC CORPORATION, Tokyo (JP); UNIVERSITY OF TSUKUBA, Tsukuba (JP)

(*) Notice: Subject to any disclaimer, the term of this patent is extended or adjusted under 35 U.S.C. 154(b) by 213 days.

(21) Appl. No.: 18/035,867

(22) PCT Filed: Nov. 20, 2020

(86) PCT No.: PCT/JP2020/043444
§ 371 (c)(1),
(2) Date: May 8, 2023

(87) PCT Pub. No.: WO2022/107323
PCT Pub. Date: May 27, 2022

(65) Prior Publication Data
US 2023/0403143 A1    Dec. 14, 2023

(51) Int. Cl.
*H04L 9/08* (2006.01)
*G06F 21/57* (2013.01)

(52) U.S. Cl.
CPC .............. *H04L 9/085* (2013.01); *G06F 21/57* (2013.01)

(58) Field of Classification Search
CPC .... G06F 21/57; G06F 21/602; G06F 21/6227; H04L 9/085; H04L 9/0861; H04L 63/0428; H04L 2209/46
See application file for complete search history.

(56) References Cited

U.S. PATENT DOCUMENTS

| 8,964,988 B2 | 2/2015 | Nishimaki et al. |
| 9,607,173 B2 | 3/2017 | Kawamoto et al. |

(Continued)

FOREIGN PATENT DOCUMENTS

| JP | 2013-171170 A | 9/2013 |
| JP | 2015-194959 A | 11/2015 |

(Continued)

OTHER PUBLICATIONS

Marina Blanton et al., "Improved Building Blocks for Secure Multi-Party Computation based on Secret Sharing with Honest Majority", IACR Cryptol. ePrint Arch., 2019, 2019:718 . (Accepted in ACNS 2020), 26 pages.

(Continued)

*Primary Examiner* — Kevin Bechtel
(74) *Attorney, Agent, or Firm* — Sughrue Mion, PLLC

(57) ABSTRACT

A secure computation system comprising secure computation server apparatuses, each of which comprises: a discriminant share generation part that computes discriminant shares configured so that an index relating to an input corresponds to a specific value from shares representing the index relating to the input and possible combinations of index shares of an array; a combination configuration part that configures a combination of shares of an element in the array and the discriminant shares for all possible combinations of indices of the array; a shuffle part that shuffles the combinations; a reconstruction part that reconstructs the discriminant shares in the shuffled combinations; and a selection part that selects shares of an element in the array in the combinations where the reconstructed value is the specific value.

20 Claims, 12 Drawing Sheets

(56) References Cited

U.S. PATENT DOCUMENTS

| | | | |
|---|---|---|---|
| 10,541,983 B1* | 1/2020 | Khashei Varnamkhasti | ................ H04L 9/085 |
| 11,290,265 B2 | 3/2022 | Tsuchida et al. | |
| 2013/0114815 A1 | 5/2013 | Nishimaki et al. | |
| 2015/0278547 A1 | 10/2015 | Kawamoto et al. | |
| 2019/0332792 A1* | 10/2019 | Kunii | ................ G06F 21/6218 |
| 2020/0279511 A1 | 9/2020 | Hamada | |
| 2020/0374107 A1 | 11/2020 | Tsuchida et al. | |
| 2021/0105138 A1* | 4/2021 | Tysor | ................ H04L 9/3066 |

FOREIGN PATENT DOCUMENTS

| | | |
|---|---|---|
| JP | 2017-129913 A | 7/2017 |
| WO | 2012/011565 A1 | 1/2012 |
| WO | 2019/059069 A1 | 3/2019 |
| WO | 2019/111318 A1 | 6/2019 |
| WO | 2020/145340 A1 | 7/2020 |

OTHER PUBLICATIONS

Marcel Keller et al., "Efficient, Oblivious Data Structures for MPC", Advances in Cryptology-AsiaCrypt 2014, 2014, pp. 506-525, vol. 8874.

International Search Report for PCT/JP2020/043444, dated Feb. 16, 2021.

* cited by examiner

SECURE COMPUTATION SYSTEM, SECURE
COMPUTATION SERVER APPARATUS,
SECURE COMPUTATION METHOD, AND
SECURE COMPUTATION PROGRAM

CROSS REFERENCE TO RELATED
APPLICATIONS

This application is a National Stage of International Application No. PCT/JP2020/043444 filed Nov. 20, 2020.

FIELD

The present invention relates to a secure computation system, secure computation server apparatus, secure computation method, and secure computation program.

BACKGROUND

In recent years, the research and development of a technology called secure computation has been active. Secure computation is a technique that executes a predetermined process while keeping the computation process and the results thereof secret from a third party. Multi-party computation is one of the representative techniques of secure computation. In multi-party computation, confidential data is distributed to a plurality of servers (secure computation server apparatuses), and arbitrary computations are executed on the data while confidentiality is maintained even against the participants. Further, the data distributed to each secure computation server apparatus is called a "share." Hereinafter, the term "secure computation" as used herein refers to secure computation using a multi-party computation technique, unless otherwise specified.

Array reference is one of the secure computation processes. It is a process for referencing an element stored in an array, and in array reference in secure computation, an index indicating which element in an array is to be referenced should also be kept secret. In other words, a desired array element must be read from or written to while keeping even which element in the array is being accessed confidential.

For instance, decision items are used in a credit decision, and it is sometimes desired to keep secret not only the contents of the decision items but also which decision item was used in the decision. Secure computation involving array reference, in which indices are kept secret, can be applied to meet such demand. Further, since one may be able to obtain information by analyzing a pattern of which elements in an array are accessed, accessing array elements while keeping access patterns secret has security benefits.

Non-Patent Literature 1

BLANTON, Marina; KANG, Ahreum; YUAN, Chen. "Improved Building Blocks for Secure Multi-Party Computation based on Secret Sharing with Honest Majority," IACR Cryptol. ePrint Arch., 2019, 2019: 718. (Accepted in ACNS 2020)

SUMMARY

The disclosure of the literature in Citation List above is incorporated herein in its entirety by reference thereto. The following analysis is given by the present inventors.

Since confidential data is processed while being divided and distributed among a plurality of servers in secure computation using the multi-party computation technique, the communication cost must be reduced in order to improve the efficiency of the process. This communication cost can be divided into the communication volume indicating the amount of communicated data and the number of rounds indicating the number of communications with maximum parallelization. There have been research and development to reduce the communication volume and the number of rounds (for instance, refer to Non-Patent Literature 1).

Meanwhile, in secure computation involving array reference, the aspect of flexibility becomes important when different types of secure computation are combined. This is because it is rare to build a secure computation system that performs only array reference; one usually builds a system in combination with other types of secure computation. Systems that form a basis of secure computation include algebraic structures such as rings and fields, or different numbers of participants such as three-party and four-party systems.

It is not easy to reduce the communication cost while achieving flexibility at the same time. In other words, even if the communication cost can be reduced in a certain system, it may be difficult to apply the same method to a different secure computation system. For instance, the method described in Non-Patent Literature 1 cannot be extended to four- or more-party secure computation using the algebraic structure of rings. Therefore, it is desirable to reduce the communication cost without compromising the flexibility to combine different types of secure computation.

In view of the problem above, it is an object of the present invention to provide a secure computation system, secure computation server apparatus, secure computation method, and secure computation program that contribute to the reduction of the communication cost without compromising the flexibility to be combined with other types of secure computation.

According to a first aspect of the present invention, there is provided a secure computation system comprising at least three secure computation server apparatuses connected to each other via a network and referring to shares of an array element corresponding to an index in an array of shares for an input of shares representing the index, wherein each of the secure computation server apparatuses comprises: a discriminant share generation part that computes discriminant shares configured so that the index relating to the input corresponds to a specific value from the shares representing the index relating to the input and possible combinations of index shares of the array; a combination configuration part that configures a combination of shares of an element in the array and the discriminant shares for all possible combinations of indices of the array; a shuffle part that shuffles the combinations; a reconstruction part that reconstructs the discriminant shares in the shuffled combinations; and a selection part that selects shares of an element in the array in the combinations where the reconstructed value is the specific value.

According to a second aspect of the present invention, there is provided a secure computation server apparatus out of at least three secure computation server apparatuses connected to each other via a network in order to refer to shares of an array element corresponding to an index in an array of shares for an input of shares representing the index, the secure computation server apparatus including: a discriminant share generation part that computes discriminant shares configured so that the index relating to the input corresponds to a specific value from the shares representing the index relating to the input and possible combinations of index shares of the array; a combination configuration part that configures a combination of shares of an element in the array and the discriminant shares for all possible combinations of indices of the array; a shuffle part that shuffles the combinations; a reconstruction part that reconstructs the discriminant shares in the shuffled combinations; and a selection part that selects shares of an element in the array in the combinations where the reconstructed value is the specific value.

According to a third aspect of the present invention, there is provided a secure computation method comprising at least three secure computation server apparatuses connected to each other via a network and referring to shares of an array element corresponding to an index in an array of shares for an input of shares representing the index, wherein each of the secure computation server apparatuses performs: computing discriminant shares configured so that the index relating to the input corresponds to a specific value from the shares representing the index relating to the input and possible combinations of index shares of the array; configuring a combination of shares of an element in the array and the discriminant shares for all possible combinations of indices of the array; shuffling the combinations; reconstructing the discriminant shares in the shuffled combinations; and selecting shares of an element in the array in the combinations where the reconstructed value is the specific value.

According to a fourth aspect of the present invention, there is provided a secure computation program causing at least three secure computation server apparatuses connected to each other via a network to refer to shares of an array element corresponding to an index in an array of shares for an input of shares representing the index, the secure computation program including processes of: computing discriminant shares configured so that the index relating to the input corresponds to a specific value from the shares representing the index relating to the input and possible combinations of index shares of the array; configuring a combination of shares of an element in the array and the discriminant shares for all possible combinations of indices of the array; shuffling the combinations; reconstructing the discriminant shares in the shuffled combinations; and selecting shares of an element in the array in the combinations where the reconstructed value is the specific value. Further, this program can be stored in a computer-readable storage medium. The storage medium may be a non-transient one such as a semiconductor memory, a hard disk, a magnetic recording medium, an optical recording medium, and the like. The present invention can also be realized as a computer program product.

According to each aspect of the present invention, it becomes possible to provide a secure computation system, secure computation server apparatus, secure computation method, and secure computation program that contribute to the reduction of the communication cost without compromising the flexibility to be combined with other types of secure computation.

EXAMPLE EMBODIMENTS

Example embodiments of the present invention will be described with reference to the drawings. The present invention, however, is not limited to the example embodiments described below. Further, in each drawing, the same or corresponding elements are appropriately designated by the same reference signs. It should also be noted that the drawings are schematic, and the dimensional relationships and the ratios between the elements may differ from the actual ones. The dimensional relationships and the ratios between drawings may also be different in some sections.

First Example Embodiment

Figure 1:
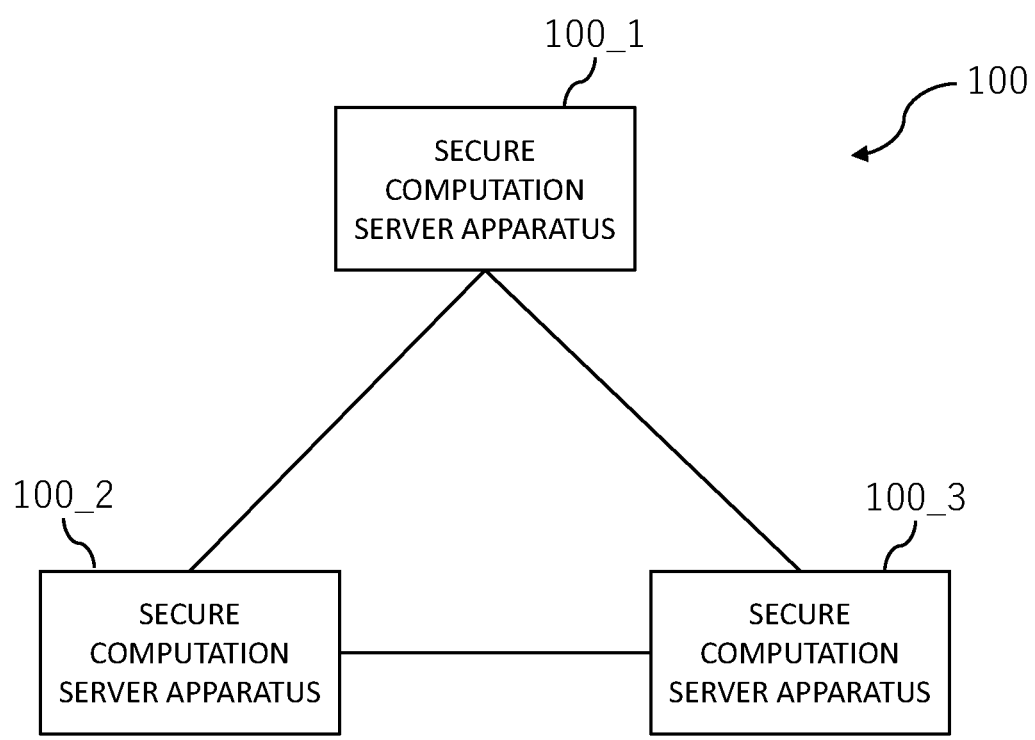
FIG. 1 is a block diagram showing an example of the functional configuration of a secure computation system according to a first example embodiment.
Figure 2:
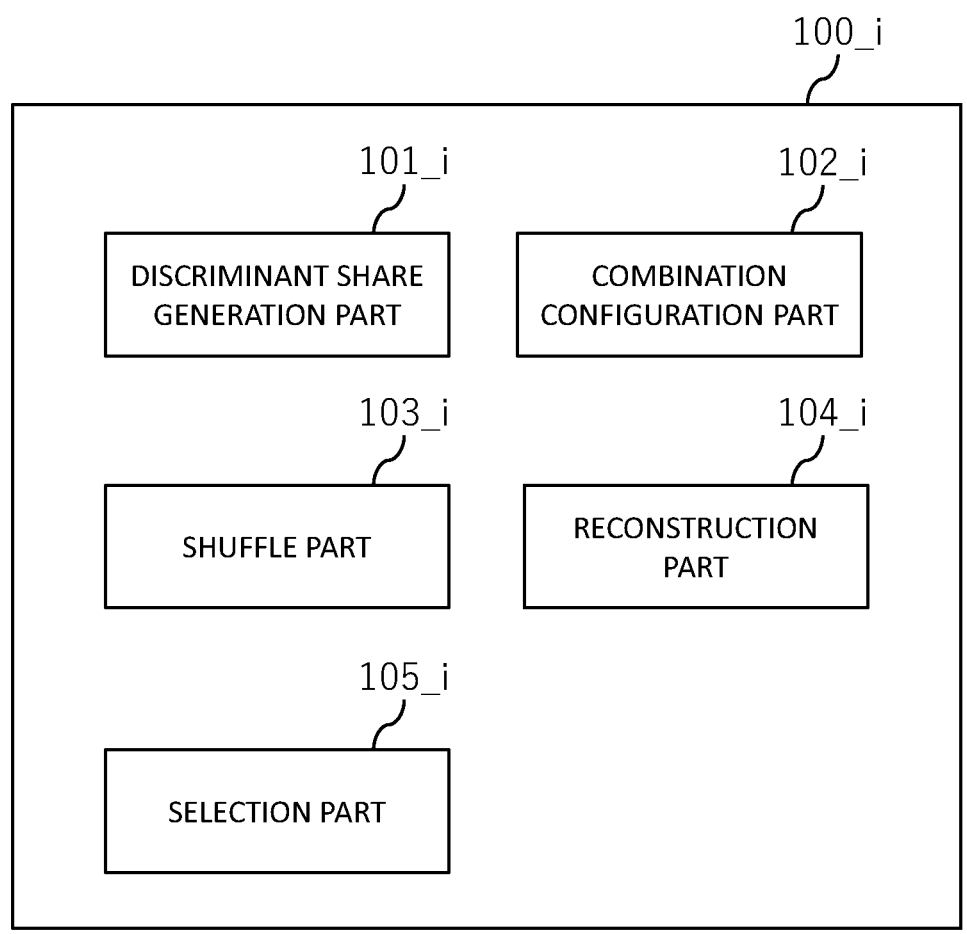
FIG. 2 is a block diagram showing an example of the functional configuration of a secure computation server apparatus according to the first example embodiment.

The following describes a secure computation system and secure computation server apparatus relating to a first example embodiment with reference to FIGS. 1 and 2. In the first example embodiment, only the basic concept of the present invention is described. Further, in the first example embodiment, a secure computation system comprising three secure computation server apparatuses will be described for convenience of illustration, however, the present example embodiment is not limited to a secure computation system comprising three secure computation server apparatuses, as demonstrated in the example embodiments described later.

FIG. 1 is a block diagram showing an example of the functional configuration of the secure computation system according to the first example embodiment. As shown in FIG. 1, the secure computation system 100 according to the first example embodiment comprises a first secure computation server apparatus 100_1, a second secure computation server apparatus 100_2, and a third secure computation server apparatus 100_3. The first, the second, and the third secure computation server apparatuses 100_1, 100_2, and 100_3 are connected to each other via a network so as to be able to communicate with each other.

The secure computation system 100 comprising the first to the third secure computation server apparatuses 100_$i$ ($i$=1, 2, 3) is able to compute desired shares of a value supplied by any one of the first to the third secure computation server apparatuses $100\_i$ (i=1, 2, 3) as an input while keeping the input value and the values during the computation process secret, and distribute the computation results to the first to the third secure computation server apparatuses $100\_i$ (i=1, 2, 3) to store them therein.

Further, the secure computation system 100 comprising the first to the third secure computation server apparatuses $100\_i$ (i=1, 2, 3) is able to compute desired shares of shares distributed to and stored in the first to the third secure computation server apparatuses $100\_i$ (i=1, 2, 3) while keeping the values during the computation process secret, and distribute the computation results to the first to the third secure computation server apparatuses $100\_i$ (i=1, 2, 3) to store them therein.

Further, the shares that resulted from the computations above may be reconstructed by exchanging the shares with the first to the third secure computation server apparatuses $100\_1$ to $100\_3$. Alternatively, the shares may be decoded by transmitting them to an external apparatus, instead of the first to the third secure computation server apparatuses $100\_1$ to $100\_3$.

For instance, a replicated secret sharing scheme, an additive secret sharing scheme, or Shamir's secret sharing scheme may be used to secretly distribute shares to the first to the third secure computation server apparatuses $100\_i$ (i=1, 2, 3) and store them therein. An appropriate scheme may be selected without being limited to the first example embodiment. For instance, an additive secret sharing scheme is selected if the basis of the secure computation system is the algebraic structure of rings, and Shamir's secret sharing scheme is selected if the basis is the algebraic structure of fields.

Shares of an index idx are notated as [idx]; the j-th element of an array as $L_j$; and shares of an element $L_j$ as $[L_j]$. Then, for an input of shares [idx] representing an index idx, an algorithm that refers to shares $[L_{idx}]$ of an array element corresponding to the index idx of an array $\{[L_j]\}_{j=0}^{m-1}$ of m shares is as follows:

$$[L_{idx}] \leftarrow \pi([idx], \{[L_j]\}_{j=0}^{m-1})$$ [Math. 1]

The secure computation system 100 according to the first example embodiment implements the above algorithm by having the first to the third secure computation server apparatuses $100\_i$ (i=1, 2, 3) configured as shown in FIG. 2, which is a block diagram showing an example of the functional configuration of the secure computation server apparatus according to the first example embodiment. Note that the secure computation server apparatus $100\_i$ shown in FIG. 2 represents the commonality of all of the first to the third secure computation server apparatuses $100\_i$ (i=1, 2, 3).

As shown in FIG. 2, the secure computation server apparatus $100\_i$ comprises a discriminant share generation part $101\_i$, a combination configuration part $102\_i$, a shuffle part $103\_i$, a reconstruction part $104\_i$, and a selection part $105\_i$.

From shares [idx] representing an index idx relating to an input and possible combinations of index shares $\{[j]\}_{j=0}^{m-1}$ of an array $\{[L_j]\}_{j=0}^{m-1}$ of m elements, the discriminant share generation part $101\_i$ computes discriminant shares $[d_j]$ configured so that the index idx relating to the input corresponds to a specific value s. Concrete methods for computing the discriminant shares $[d_j]$ will be disclosed in the descriptions of the example embodiments below. A concrete method for computing the discriminant shares $[d_j]$ in the case of a secure computation system using the algebraic structure of rings will be disclosed in the description of a second example embodiment. Further, a concrete method for computing the discriminant shares $[d_j]$ in the case of a secure computation system using the algebraic structure of fields will be disclosed in the description of a third example embodiment. In the present example embodiment, the following description is based on the common properties of these discriminant shares $[d_j]$.

The combination configuration part $102\_i$ configures a combination $\{[L_j], [d_j]\}$ of shares $[L_j]$ of an array element and the discriminant shares $[d_j]$ for all possible combinations of indices j of the array $\{[L_j]\}_{j=0}^{m-1}$.

The shuffle part $103\_i$ shuffles a combination set $\{[L_j], [d_j]\}_{j=0}^{m-1}$. Since this shuffling can be thought of as a one-to-one replacement of an index j in $\{[L_j], [d_j]\}_{j=0}^{m-1}$ with another index k, the shuffled combinations are notated as $\{[L_k], [d_k]\}_{k=0}^{m-1}$. Further, the shuffle here is not a local one performed independently by each secure computation server apparatus $100\_i$ (i=1, 2, 3), but a cooperative shuffle performed by the secure computation server apparatuses $100\_i$ (i=1, 2, 3).

The reconstruction part $104\_i$ reconstructs discriminant shares $[d_k]$ in the shuffled combinations $\{[L_k], [d_k]\}_{k=0}^{m-1}$.

The selection part $105\_i$ selects shares $[L_k]$ of an array element in the combinations $\{[L_k], [d_k]\}_{k=0}^{m-1}$ where the reconstructed value $d_k$ is the specific value s. Here, noting that, as a property thereof, the discriminant shares $[d_j]$ are configured so that the index idx relating to the input corresponds to the specific value s, one can see that $[L_k]=[L_{idx}]$ holds for an index k where $d_k=s$. Therefore, the shares $[L_k]$ selected by the selection part $105\_i$ are the shares $[L_{idx}]$ of the array element corresponding to the desired index idx.

By having the first to the third secure computation server apparatuses $100\_i$ (i=1, 2, 3) configured as described above, the secure computation system 100 according to the first example embodiment is able to refer to shares $[L_{idx}]$ of an array element corresponding to a desired index idx without reconstructing the index idx from shares [idx] of the index idx supplied as an input. In other words, the secure computation system 100 according to the first example embodiment is able to read from and write to the desired array element $[L_{idx}]$ while keeping even which element in an array $\{[L_j]\}_{j=0}^{m-1}$ is being accessed confidential.

As demonstrated in the second and the third example embodiments described later, since the secure computation system 100 according to the first example embodiment can be appropriately applied to the algebraic structure of rings or the algebraic structure of fields as a basis, the flexibility to be combined with other types of secure computation is not compromised. Further, as demonstrated in fourth and fifth example embodiments described later, the number of the secure computation server apparatuses included in the secure computation system is not limited to three, and the secure computation system can be expanded to one comprising N secure computation server apparatuses (N is a natural number greater than 3).

Secure Computation Method

Figure 3:
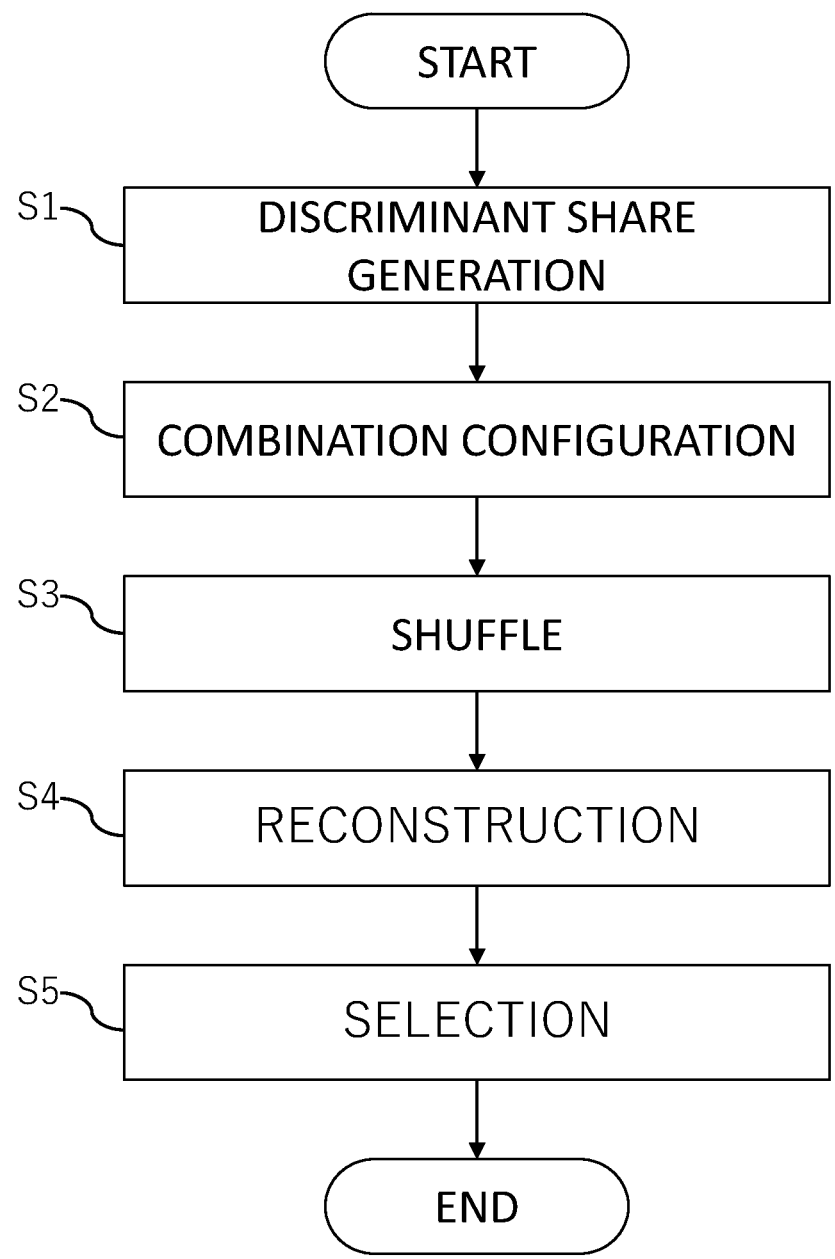
FIG. 3 is a flowchart showing an outline of the procedure of a secure computation method.

The secure computation system 100 according to the first example embodiment can be naturally extended to the invention of a secure computation method. FIG. 3 is a flowchart showing an outline of the procedure of the secure computation method.

As shown in FIG. 3, the secure computation method includes a discriminant share generation step (S1), a combination configuration step (S2), a shuffle step (S3), a reconstruction step (S4), and a selection step (S5).

From shares [idx] representing an index idx relating to an input and possible combinations of index shares $\{[j]\}_{j=0}^{m-1}$ of an array $\{[L_j]\}_{j=0}^{m-1}$ of m elements, the discriminant share generation step (S1) computes discriminant shares [$d_j$] configured so that the index idx relating to the input corresponds to a specific value s.

The combination configuration step (S2) configures combinations $\{[L_j], [d_j]\}_{j=0}^{m-1}$ of shares [$L_j$] of array elements and the discriminant shares [$d_j$] for all possible combinations of indices j of the array $\{[L_j]\}_{j=0}^{m-1}$.

The shuffle step (S3) shuffles combinations $\{[L_j], [d_j]\}_{j=0}^{m-1}$. Since this shuffling can be thought of as a one-to-one replacement of an index j in $\{[L_j], [d_j]\}_{j=0}^{m-1}$ with another index k, shuffled combinations are notated as $\{[L_k], [d_k]\}_{k=0}^{m-1}$.

The reconstruction step (S4) reconstructs discriminant shares [$d_k$] in the shuffled combinations $\{[L_k], [d_k]\}_{k=0}^{m-1}$.

The selection step (S5) selects shares [$L_k$] of an array element in the combinations $\{[L_k], [d_k]\}_{k=0}^{m-1}$ where the reconstructed value $d_k$ is the specific value s. The shares [$L_k$] selected by the selection part 105_i are the shares [$L_{idx}$] of the array element corresponding to the desired index idx.

The secure computation method described above is also able to refer to shares [$L_{idx}$] of an array element corresponding to a desired index idx. In other words, the secure computation system 100 according to the first example embodiment is able to read from and write to the desired array element [$L_{idx}$] while keeping even which element in an array $\{[L_j]\}_{j=0}^{m-1}$ is being accessed confidential. Further, the flexibility to be combined with other types of secure computation is not compromised.

Second Example Embodiment

Figure 4:
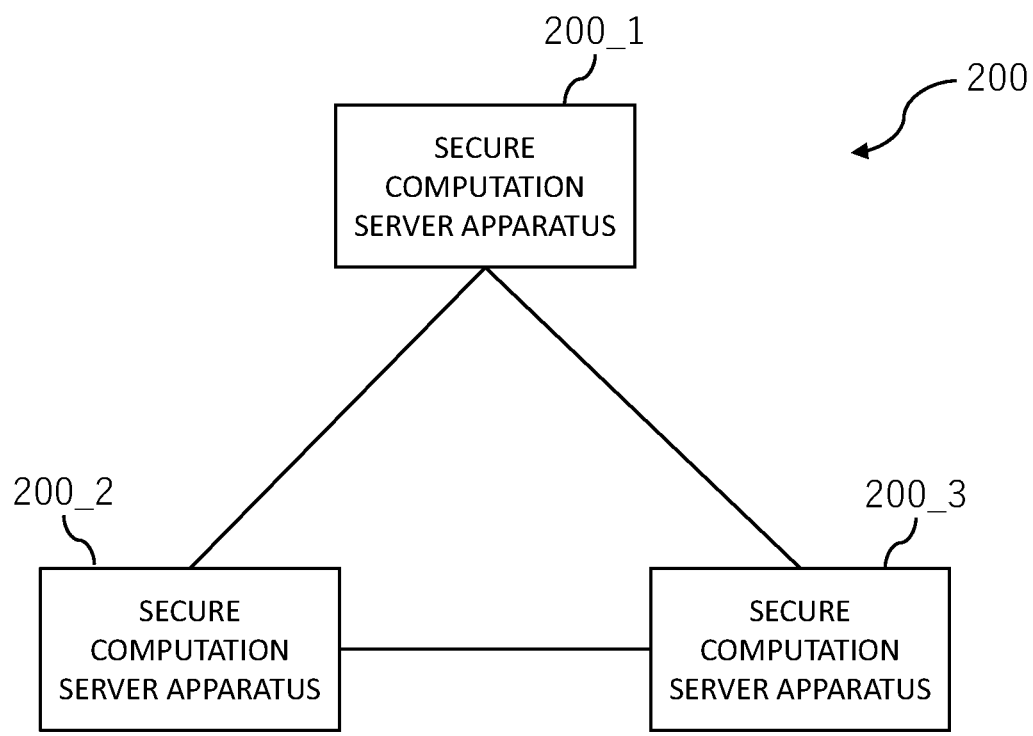
FIG. 4 is a block diagram showing an example of the functional configuration of a secure computation system according to a second example embodiment.
Figure 5:
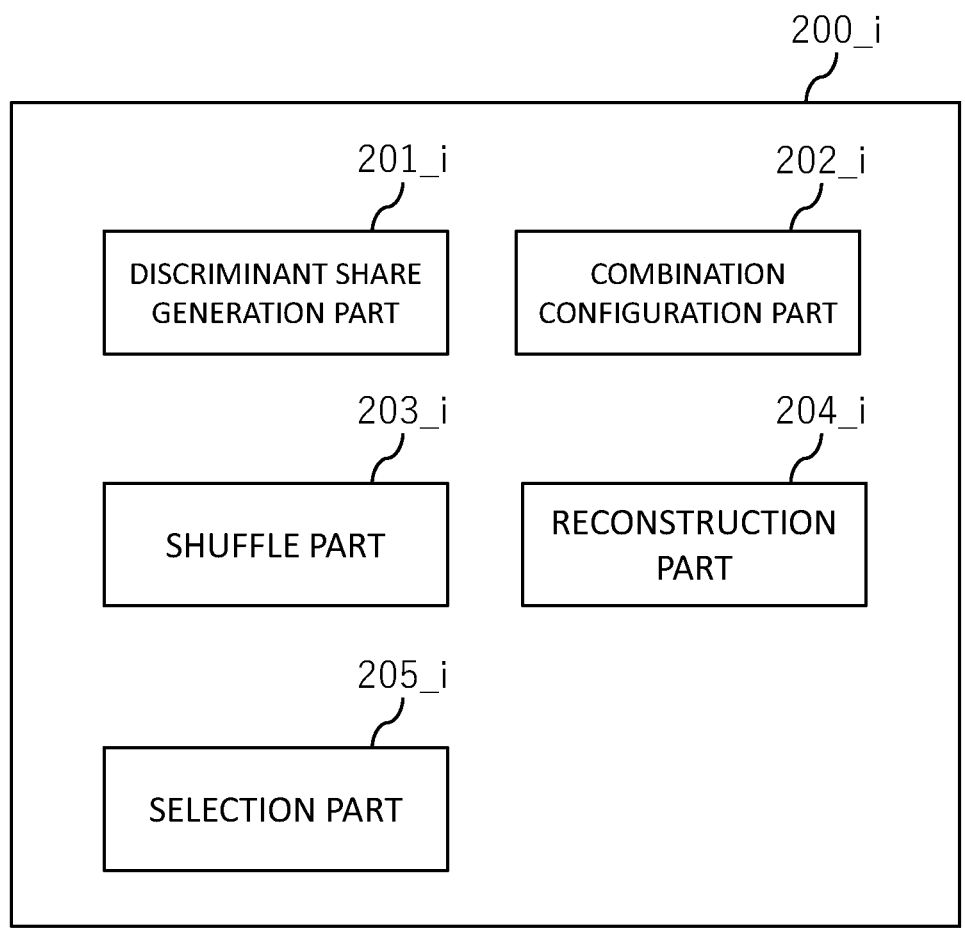
FIG. 5 is a block diagram showing an example of the functional configuration of a secure computation server apparatus according to the second example embodiment.

The following describes a secure computation system and secure computation server apparatus relating to the second example embodiment with reference to FIGS. 4 and 5. In the second example embodiment, the secure computation system relating to the first example embodiment is applied to a three-party secure computation system based on the algebraic structure of rings.

FIG. 4 is a block diagram showing an example of the functional configuration of the secure computation system according to the second example embodiment. As shown in FIG. 4, the secure computation system 200 according to the second example embodiment comprises a first secure computation server apparatus 200_1, a second secure computation server apparatus 200_2, and a third secure computation server apparatus 200_3. The first, the second, and the third secure computation server apparatuses 200_1, 200_2, and 200_3 are connected to each other via a network so as to be able to communicate with each other.

The secure computation system 200 comprising the first to the third secure computation server apparatuses 200_i (i=1, 2, 3) is able to compute desired shares of a value supplied by any one of the first to the third secure computation server apparatuses 200_i (i=1, 2, 3) as an input while keeping the input value and the values during the computation process secret, and distribute the computation results to the first to the third secure computation server apparatuses 200_i (i=1, 2, 3) to store them therein.

FIG. 5 is a block diagram showing an example of the functional configuration of the secure computation server apparatus according to the second example embodiment. Note that the secure computation server apparatus 200_i shown in FIG. 5 represents the commonality of all of the first to the third secure computation server apparatuses 200_i (i=1, 2, 3). As shown in FIG. 5, the secure computation server apparatus 200_i comprises a discriminant share generation part 201_i, a combination configuration part 202_i, a shuffle part 203_i, a reconstruction part 204_i, and a selection part 205_i.

For instance, a replicated secret sharing scheme may be used to secretly distribute shares to the first to the third secure computation server apparatuses 200_i (i=1, 2, 3) and store them therein. Here, we use shares of a residue class ring $Z_n$ of order n (n is a natural number equal to or greater than 3) and shares of a residue class ring $Z_2$ of order 2, distinguishing them by notating the shares of the residue class ring $Z_n$ of order n as $[x]^R$ and the shares of the residue class ring $Z_2$ of order 2 as $[x]^2$. The goal is to refer to shares $[L_{idx}]^R$ of an array element corresponding to an index idx of an array $\{[L_j]^R\}_{j=0}^{m-1}$ of $2^h$ (=m) shares for an input of shares $[idx]^R$ representing the index idx.

From the shares $[idx]^R$ representing the index idx relating to the input and possible combinations of index shares of the array $\{[L_j]^R\}_{j=0}^{m-1}$ of $2^h$ (=m) elements, the discriminant share generation part 201_i computes discriminant shares configured so that the index idx relating to the input corresponds to a specific value s. More specifically, the discriminant share generation part 201_i performs the following computation.

First, the discriminant share generation part 201_i bit-decomposes $[idx]^R$ to convert them into shares $[idx_0]^2$, $[idx_1]^2$, ..., $[idx_h]^2$ in the residue class ring $Z_2$ of order 2. Meanwhile, $[P_{0,0}]^2$, $[P_{1,0}]^2$, $[P_{0,1}]^2$, $[P_{1,1}]^2$, ..., $[P_{0,h-1}]^2$, $[P_{1,h-1}]^2$ are possible indices of the array $\{[L_j]^R\}_{j=0}^{m-1}$ of $2^h$ (=m) elements represented as shares in the residue class ring $Z_2$, where $P_{0,j}$ denotes that the j-th bit is 0 and $P_{1,j}$ denotes that the j-th bit is 1.

The discriminant shares [$d_j$] below can be computed by using exclusive OR on these shares in the residue class ring $Z_2$. Note that j in [Math. 2] below is possible indices j of the array $\{[L_j]^R\}_{j=0}^{m-1}$ of $2^h$ (=m) elements. Further, the right-hand side of [Math. 2] below is a set of shares in the residue class ring $Z_2$, but is represented by [$d_j$] for the sake of simplicity.

$$[d_j] = \{[P_{j[0],0} \oplus idx_0 \oplus 1]^2, [P_{j[1],0} \oplus idx_1 \oplus 1]^2, \ldots [P_{j[h-1],0} \oplus idx_{h-1} \oplus 1]^2\} \quad [\text{Math. 2}]$$

With respect to the discriminant shares [$d_j$] computed as described, $[d_j] = \{[1]^2, [1]^2, \ldots [1]^2\}$ when j matches the index idx relating to the input. In other words, the discriminant shares [$d_j$] thus computed are configured so that the index relating to the input corresponds to a specific value (s=\{1, 1, ..., 1\}). Further, when being moved across the possible range of the indices j, the discriminant shares [$d_j$] move across all possible combinations of 0 and 1.

The combination configuration part 202_i configures a combination $C_j = \{[L_j]^R, [d_j]\}$ of shares $[L_j]^R$ of an array element and the discriminant shares [$d_j$] for all possible combinations of indices j. Specifically, the combination $C_j$ is notated as follows:

$$C_j = [L_j]^R, \{[P_{j[0],0} \oplus idx_0 \oplus 1]^2, [P_{j[1],0} \oplus idx_1 \oplus 1]^2, \ldots [P_{j[h-1],0} \oplus idx_{h-1} \oplus 1]^2\} \quad [\text{Math. 3}]$$

The shuffle part 203_i shuffles a combination set $\{C_j | j=0, \ldots, 2^h-1\}$. Since this shuffling can be thought of as a one-to-one replacement of an index j in $\{C_j | j=0, \ldots, 2^h-1\}$ with another index k, the shuffled combinations are notated as $\{C_k | k=0, \ldots, 2^h-1\}$.

The reconstruction part 204_i reconstructs discriminant shares [$d_k$] in the shuffled combinations $\{C_k = \{[L_k]^R,$ $[d_k]\} | k=0, \ldots, 2^h-1\}$. $d_k$ is h digits of 0 or 1, and as stated above, when being moved across the possible range of the indices j, it moves across all possible combinations of 0 and 1. Therefore, reconstructing the discriminant shares $[d_k]$ does not compromise secrecy.

Since the discriminant shares $[d_k]$ equal $\{[1]^2, [1]^2, \ldots, [1]^2\}$ when k matches the index idx relating to the input, the selection part 205_i selects k that satisfies this condition. $[L_k]^R$ with this k is the shares $[L_{idx}]^R$ of the array element corresponding to the desired index idx.

As described above, in secure computation using the algebraic structure of rings, the secure computation system 200 according to the second example embodiment is able to refer to shares $[L_{idx}]^R$ of an array element corresponding to a desired index idx supplied as an input without reconstructing the index idx from shares $[idx]^R$ of the index idx. In other words, the secure computation system 200 according to the second example embodiment is able to read from and write to the desired array element $[L_{idx}]^R$ while keeping even which element in an array $\{[L_j]^R\}_{j=0}^{m-1}$ is being accessed confidential.

Further, at this time, the secure computation system 200 according to the second example embodiment has four rounds and a communication volume of $6\cdot 2^h\cdot(k+h)+2^h\cdot h$ as the communication cost of array reference. For instance, since the three-party construction in Non-Patent Literature 1 has 12 rounds and a communication volume of (7 m+5 log(m)+6) log(p) as the communication cost of array reference, the secure computation system 200 according to the second example embodiment has a low communication cost in terms of array reference. In other words, the secure computation system 200 is able to contribute to the reduction of the communication cost without compromising the flexibility to be combined with other types of secure computation using the algebraic structure of rings.

Third Example Embodiment

Figure 6:
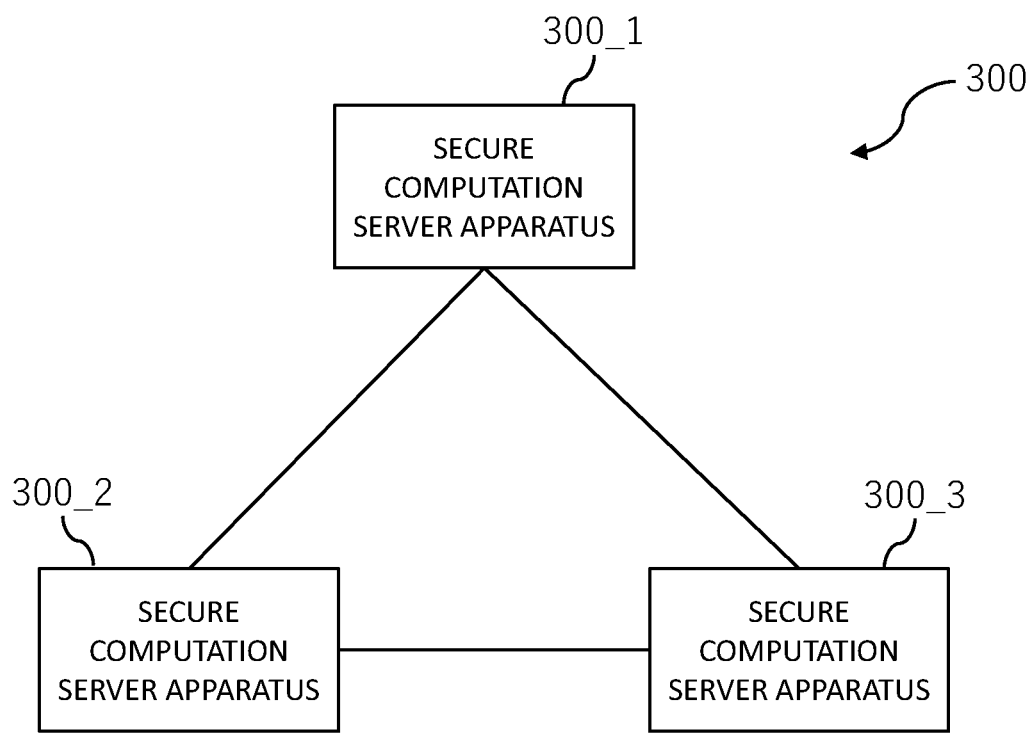
FIG. 6 is a block diagram showing an example of the functional configuration of a secure computation system according to a third example embodiment.
Figure 7:
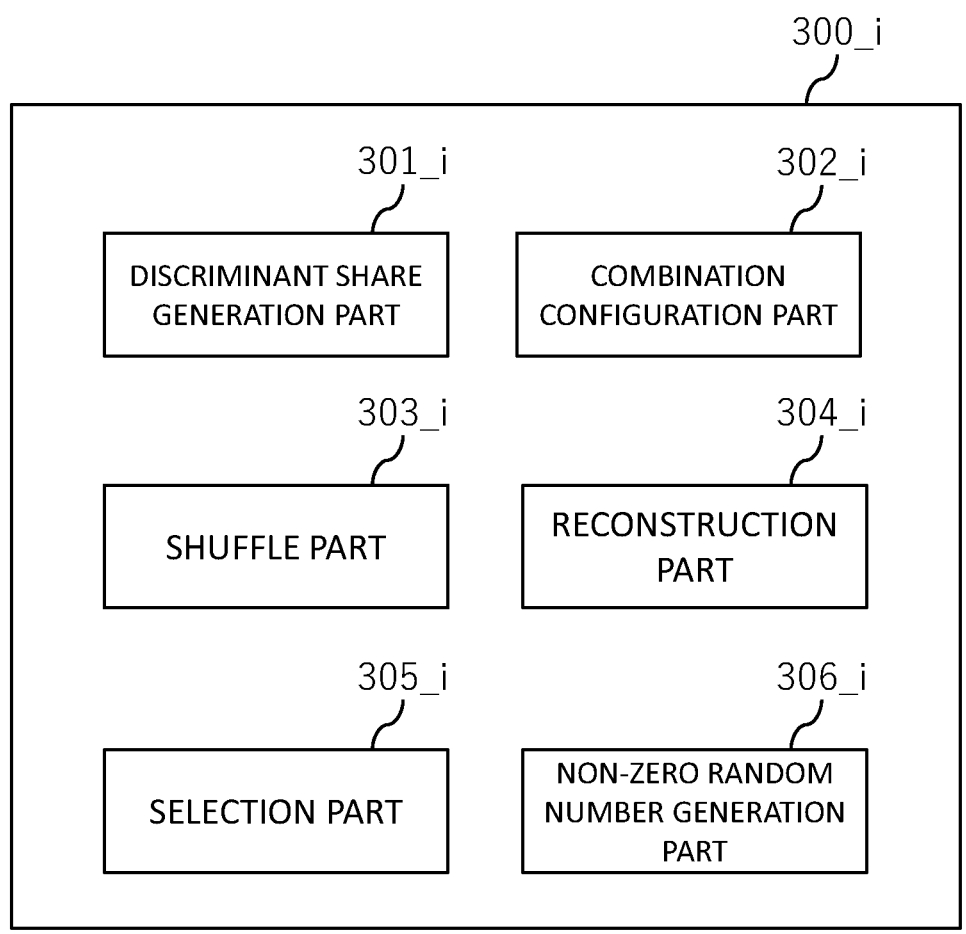
FIG. 7 is a block diagram showing an example of the functional configuration of a secure computation server apparatus according to the third example embodiment.

The following describes a secure computation system and secure computation server apparatus relating to the third example embodiment with reference to FIGS. 6 and 7. In the third example embodiment, the secure computation system relating to the first example embodiment is applied to a three-party secure computation system based on the algebraic structure of fields.

FIG. 6 is a block diagram showing an example of the functional configuration of the secure computation system according to the third example embodiment. As shown in FIG. 6, the secure computation system 300 according to the third example embodiment comprises a first secure computation server apparatus 300_1, a second secure computation server apparatus 300_2, and a third secure computation server apparatus 300_3. The first, the second, and the third secure computation server apparatuses 300_1, 300_2, and 300_3 are connected to each other via a network so as to be able to communicate with each other.

The secure computation system 300 comprising the first to the third secure computation server apparatuses 300_i (i=1, 2, 3) is able to compute desired shares of a value supplied by any one of the first to the third secure computation server apparatuses 300_i (i=1, 2, 3) as an input while keeping the input value and the values during the computation process secret, and distribute the computation results to the first to the third secure computation server apparatuses 300_i (i=1, 2, 3) to store them therein.

FIG. 7 is a block diagram showing an example of the functional configuration of the secure computation server apparatus according to the third example embodiment. Note that the secure computation server apparatus 300_i shown in FIG. 7 represents the commonality of all of the first to the third secure computation server apparatuses 300_i (i=1, 2, 3). As shown in FIG. 7, the secure computation server apparatus 300_i comprises a discriminant share generation part 301_i, a combination configuration part 302_i, a shuffle part 303_i, a reconstruction part 304_i, a selection part 305_i, and a non-zero random number generation part 306_i.

For instance, Shamir's secret sharing scheme may be used to secretly distribute shares to the first to the third secure computation server apparatuses 300_i (i=1, 2, 3) and store them therein. The algebraic structure of fields used is a finite field $F_p$ modulo a prime p; here, n in the residue class ring $Z_n$ of order n used in the second example embodiment is replaced with the prime p. Therefore, the finite field $F_p$ is a subordinate concept of the residue class ring $Z_n$, and shares in the finite field $F_p$ are notated as $[x]^P$.

First, as a preparation, the non-zero random number generation part 306_i generates a non-zero random number. A non-zero random number is a random number that has a value in $F_p^x$ obtained by excluding zero from the finite field $F_p$ and is kept secret from any of the participants in the secure computation. The non-zero random number generation part 306_i generates a non-zero random number as follows.

The non-zero random number generation part 306_i in each of the first to the third secure computation server apparatuses 300_i (i=1, 2, 3) independently generates non-zero random numbers $r_{j,i}$ for possible indices j of an array. Then, the non-zero random number generation part 306_i secretly distributes the generated non-zero random numbers $r_{j,i}$ to the first to the third secure computation server apparatuses 300_i (i=1, 2, 3), which store shares $[r_{j,i}]^P$ of the non-zero random numbers $r_{j,i}$ therein. The final non-zero random number is defined as the product of these $[r_{j,i}]^P$: $[r_j]^P=[r_{j,0}]^P[r_{j,1}]^P[r_{j,2}]^P$. This non-zero random number $[r_j]^P$ is non-zero because it is the product of non-zero numbers and is kept secret from any of the participants in the secure computation.

From shares $[idx]^P$ representing an index idx relating to an input and possible combinations of index shares of an array $\{[L_j]^R\}_{j=0}^{m-1}$ of m elements, the discriminant share generation part 301_i computes discriminant shares configured so that the index idx relating to the input corresponds to a specific value s. More specifically, the discriminant share generation part 301_i performs the following computation.

First, the discriminant share generation part 301_i calculates the arithmetic difference $([idx]^P-j)$ between the shares $[idx]^P$ representing the index relating to the input and possible index shares j. Then, the discriminant share generation part 301_i obtains the discriminant shares $[d_j]^P$ by multiplying this arithmetic difference $([idx]^P-j)$ by the non-zero random number $[r_j]^P$.

The discriminant shares $[d_j]^P$ obtained as described will be zero when the arithmetic difference $([idx]^P-j)$ is zero and non-zero when the arithmetic difference $([idx]^P-j)$ is not zero. In other words, the discriminant shares $[d_j]^P$ are configured so that the index idx relating to the input corresponds to a specific value (s=0). Further, since the discriminant shares $[d_j]^P$ are obtained by multiplying the arithmetic difference $([idx]^P-j)$ by the non-zero random number $[r_j]^P$, reconstructing the discriminant shares $[d_j]^P$ does not leak information from a non-zero value.

The combination configuration part 302_i configures a combination $C_j=[\{L_j]^P, [d_j]\}$ of shares $[L_j]^P$ of an array element and the discriminant shares $[d_j]$ for all possible combinations of indices j. Specifically, the combination $C_j$ is notated as shown below.

The shuffle part 303_i shuffles a combination set $\{C_j|j=0, \ldots, m\}$. Since this shuffling can be thought of as a one-to-one replacement of an index j in $\{C_j|j=0, \ldots, m\}$ with another index k, the shuffled combinations are notated as $\{C_k|k=0, \ldots, m\}$.

The reconstruction part 304_i reconstructs discriminant shares $[d_k]$ in the shuffled combinations $\{C_k=[\{L_k\}^p, [d_k]\}|k=0, \ldots, m\}$.

Since the discriminant shares $[d_k]$ become zero when k matches the index idx relating to the input, the selection part 305_i selects k that satisfies this condition. $[L_k]^p$ with this k is the shares $[L_{idx}]^p$ of the array element corresponding to the desired index idx.

As described above, in secure computation using the algebraic structure of fields, the secure computation system 300 according to the third example embodiment is able to refer to shares $[L_{idx}]^p$ of an array element corresponding to a desired index idx supplied as an input without reconstructing the index idx from shares $[idx]^p$ of the index idx. In other words, the secure computation system 300 according to the third example embodiment is able to read from and write to the desired array element $[L_{idx}]^p$ while keeping even which element in an array $\{[L_j]^p\}_{j=0}^{m-1}$ is being accessed confidential.

Further, at this time, the secure computation system 300 according to the third example embodiment has eight rounds and a communication volume of 51 mlog(p) as the communication cost of array reference. For instance, since the three-party construction in Non-Patent Literature 1 has 12 rounds and a communication volume of (7 m+5 log(m)+6)log(p) as the communication cost of array reference, the secure computation system 300 according to the third example embodiment has a low communication cost in terms of array reference. In other words, the secure computation system 300 is able to contribute to the reduction of the communication cost without compromising the flexibility to be combined with other types of secure computation using the algebraic structure of fields.

Fourth Example Embodiment

Figure 8:
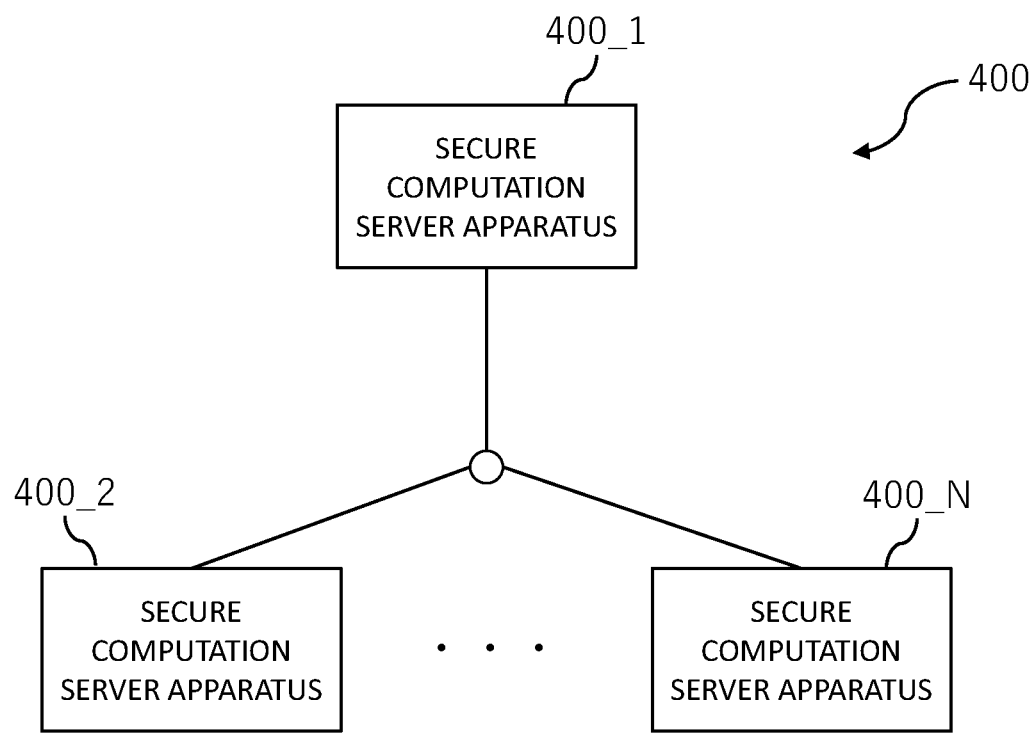
FIG. 8 is a block diagram showing an example of the functional configuration of a secure computation system according to a fourth example embodiment.
Figure 9:
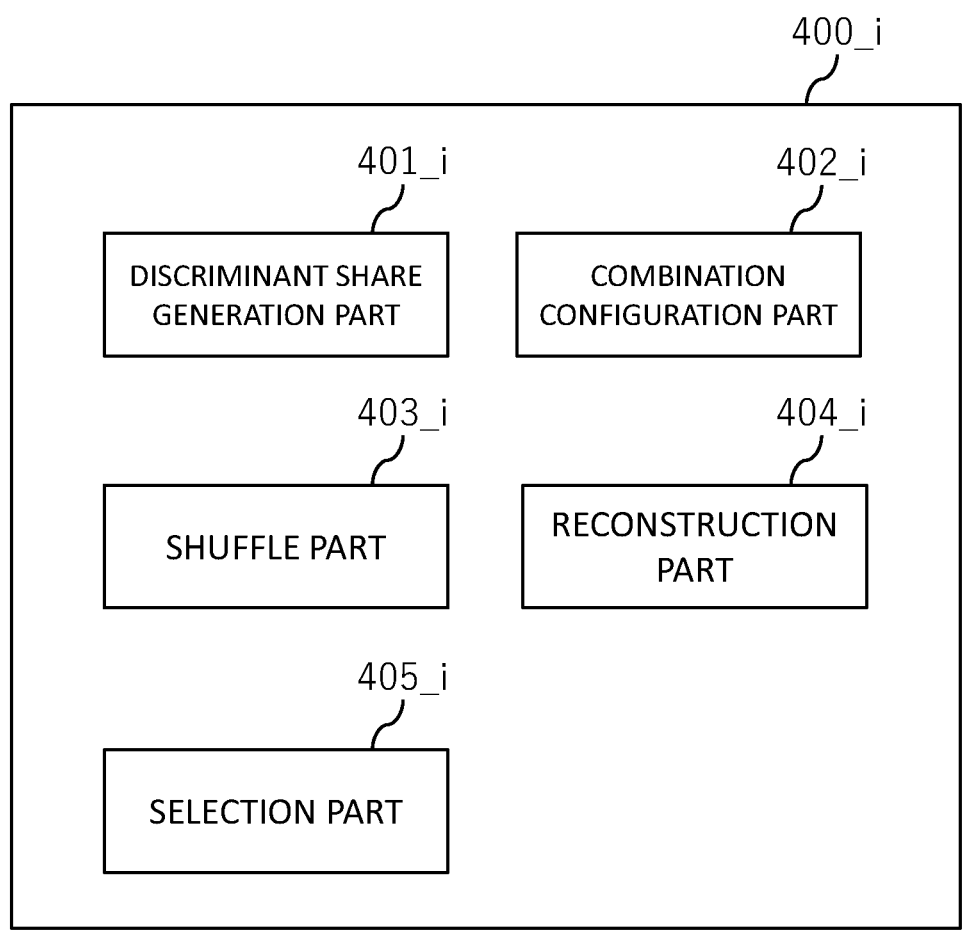
FIG. 9 is a block diagram showing an example of the functional configuration of a secure computation server apparatus according to the fourth example embodiment.

The following describes a secure computation system and secure computation server apparatus relating to the fourth example embodiment with reference to FIGS. 8 and 9. In the fourth example embodiment, the secure computation system relating to the second example embodiment is applied to an N-party secure computation system.

FIG. 8 is a block diagram showing an example of the functional configuration of the secure computation system according to the fourth example embodiment. As shown in FIG. 8, the secure computation system 400 according to the fourth example embodiment comprises first to N-th secure computation server apparatuses 400_i (i=1, 2, . . . , N). The first to the N-th secure computation server apparatuses 400_i (i=1, 2, . . . , N) are connected to each other via a network so as to be able to communicate with each other.

The secure computation system 400 comprising the first to the N-th secure computation server apparatuses 400_i (i=1, 2, . . . , N) is able to compute desired shares of a value supplied by any one of the first to the N-th secure computation server apparatuses 400_i (i=1, 2, . . . , N) as an input while keeping the input value and the values during the computation process secret, and distribute the computation results to the first to the N-th secure computation server apparatuses 400_i (i=1, 2, . . . , N) to store them therein.

FIG. 9 is a block diagram showing an example of the functional configuration of the secure computation server apparatus according to the fourth example embodiment. Note that the secure computation server apparatus 400_i shown in FIG. 9 represents the commonality of all of the first to the N-th secure computation server apparatuses 400_i (i=1, 2, . . . , N). As shown in FIG. 9, the secure computation server apparatus 400_i comprises a discriminant share generation part 401_i, a combination configuration part 402_i, a shuffle part 403_i, a reconstruction part 404_i, and a selection part 405_i.

For instance, a (t+1, N)-additive secret sharing scheme may be used to secretly distribute shares to the first to the N-th secure computation server apparatuses 400_i (i=1, 2, . . . , N) and store them therein. Note that t should be a natural number that satisfies t<N/2.

The secure computation system 400 according to the fourth example embodiment is able to perform N-party array reference by having the first to the N-th secure computation server apparatuses 400_i (i=1, 2, . . . , N) having the same configuration and functions as the first to the third secure computation server apparatuses 200_i (i=1, 2, 3) according to the second example embodiment and selecting a secret sharing scheme as described above. In other words, the secure computation system 400 according to the fourth example embodiment is able to contribute to the reduction of the communication cost without compromising the flexibility to be combined with other types of secure computation.

Fifth Example Embodiment

Figure 10:
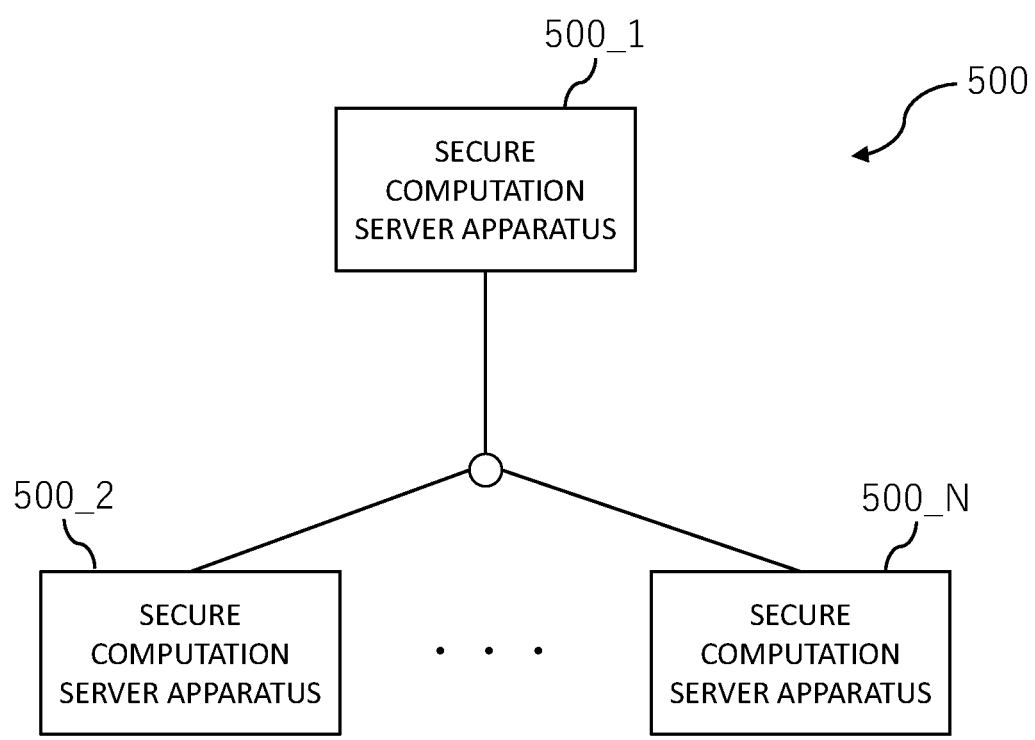
FIG. 10 is a block diagram showing an example of the functional configuration of a secure computation system according to a fifth example embodiment.
Figure 11:
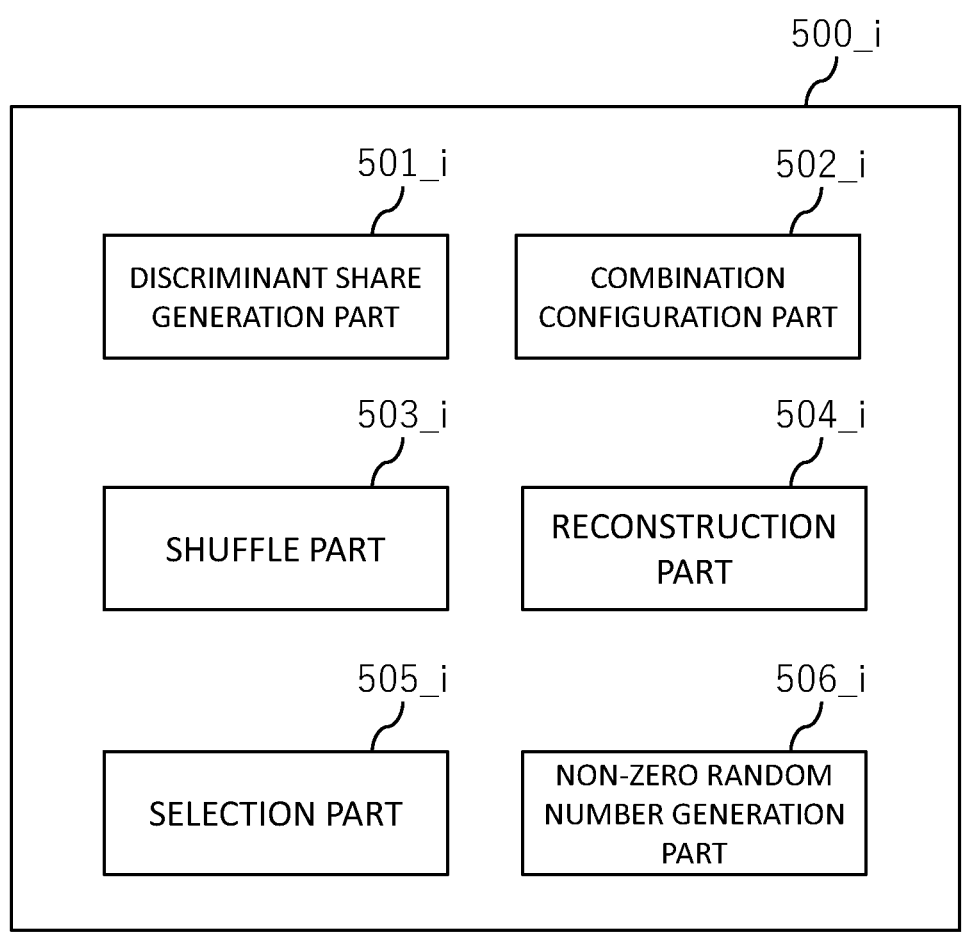
FIG. 11 is a block diagram showing an example of the functional configuration of a secure computation server apparatus according to the fifth example embodiment.

The following describes a secure computation system and secure computation server apparatus relating to the fifth example embodiment with reference to FIGS. 10 and 11. In the fifth example embodiment, the secure computation system relating to the third example embodiment is applied to an N-party secure computation system.

FIG. 10 is a block diagram showing an example of the functional configuration of the secure computation system according to the fifth example embodiment. As shown in FIG. 10, the secure computation system 500 according to the fifth example embodiment comprises first to N-th secure computation server apparatuses 500_i (i=1, 2, . . . , N). The first to the N-th secure computation server apparatuses 500_i (i=1, 2, . . . , N) are connected to each other via a network so as to be able to communicate with each other.

The secure computation system 500 comprising the first to the N-th secure computation server apparatuses 500_i (i=1, 2, . . . , N) is able to compute desired shares of a value supplied by any one of the first to the N-th secure computation server apparatuses 500_i (i=1, 2, . . . , N) as an input while keeping the input value and the values during the computation process secret, and distribute the computation results to the first to the N-th secure computation server apparatuses 500_i (i=1, 2, . . . , N) to store them therein.

FIG. 11 is a block diagram showing an example of the functional configuration of the secure computation server apparatus according to the fifth example embodiment. Note that the secure computation server apparatus 500_i shown in FIG. 11 represents the commonality of all of the first to the N-th secure computation server apparatuses 500_i (i=1, 2, . . . , N). As shown in FIG. 11, the secure computation server apparatus 500_i comprises a discriminant share generation part 501_i, a combination configuration part 502_$i$, a shuffle part 503_$i$, a reconstruction part 504_$i$, a selection part 505_$i$, and a non-zero random number generation part 506_$i$.

For instance, a (t+1, N)-additive secret sharing scheme may be used to secretly distribute shares to the first to the N-th secure computation server apparatuses 500_$i$ $qh(i=1, 2, \ldots, N)$ and store them therein. Note that t should be a natural number that satisfies $t<N/2$.

The secure computation system 500 according to the fifth example embodiment is able to perform N-party array reference by having the first to the N-th secure computation server apparatuses 500_$i$ (i=1, 2, . . . , N) having the same configuration and functions as the first to the third secure computation server apparatuses 300_$i$ (i=1, 2, 3) according to the third example embodiment and selecting a secret sharing scheme as described above. Since the non-zero random number generation part 506_$i$, however, is slightly different from the non-zero random number generation part 306_$i$ in the third example embodiment, a supplementary explanation is provided.

The non-zero random number generation part 506_$i$ in each of the first to the N-th secure computation server apparatuses 500_$i$ (i=1, 2, . . . , N) independently generates non-zero random numbers $r_{j,\,i}$ for possible indices j of an array. Then, the non-zero random number generation part 506_$i$ secretly distributes the generated non-zero random numbers $r_{j,\,i}$ to the first to the N-th secure computation server apparatuses 500_$i$ (i=1, 2, . . . , N), which store shares $[r_{j,\,i}]^P$ of the non-zero random numbers $r_{j,\,i}$.

The final non-zero random number is defined as the product of these $[r_{j,\,i}]^P$: $[r_j]^P = [r_{j,\,0}]^P [r_{j,\,1}]^P [r_{j,\,2}]^P$. This non-zero random number $[r_j]^P$ is non-zero because it is the product of non-zero numbers and is kept secret from any of the participants in the secure computation.

As described, by naturally extending the function of the non-zero random number generation part 506_$i$ of the secure computation system 500 according to the fifth example embodiment, the secure computation system relating to the third example embodiment can be applied to a N-party secure computation system. In other words, the secure computation system 500 according to the fifth example embodiment is able to contribute to the reduction of the communication cost without compromising the flexibility to be combined with other types of secure computation.

[Hardware Configuration]

Figure 12:
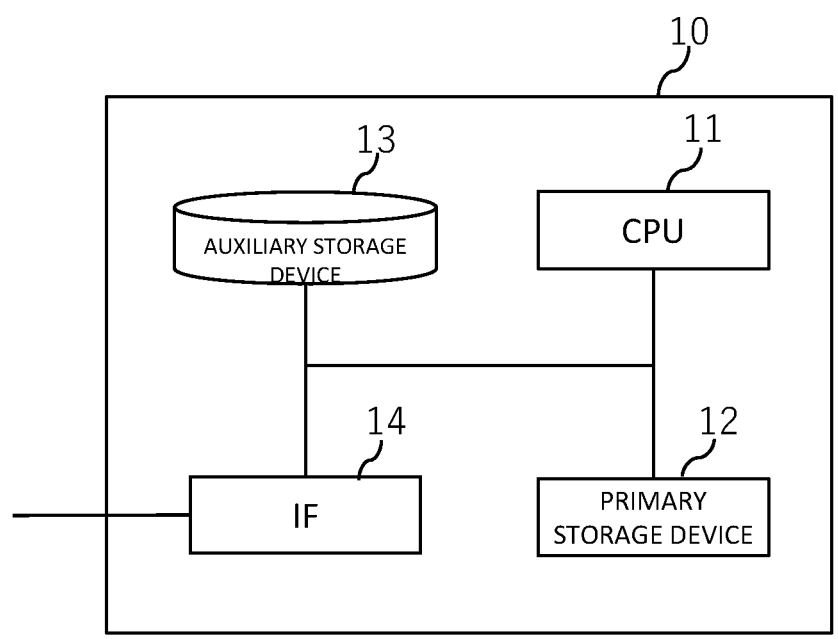
FIG. 12 is a drawing showing an example of the hardware configuration of the secure computation server apparatus.

FIG. 12 is a drawing showing an example of the hardware configuration of the secure computation server apparatus. In other words, FIG. 12 shows an example of the hardware configuration of the secure computation server apparatuses 100_$i$, 200_$i$, 300_$i$, 400_$i$, and 500_$i$. An information processing apparatus (computer) employing the hardware configuration shown in FIG. 12 can achieve the functions of the secure computation server apparatuses 100_$i$, 200_$i$, 300_$i$, 400_$i$, and 500_$i$ by executing the secure computation method described above as a program.

It should be noted that the hardware configuration example shown in FIG. 12 is merely an example of the hardware configuration that achieves the functions of the secure computation server apparatuses 100_$i$, 200_$i$, 300_$i$, 400_$i$, and 500_$i$, and is not intended to limit the hardware configuration of the secure computation server apparatuses 100_$i$, 200_$i$, 300_$i$, 400_$i$, and 500_$i$. The secure computation server apparatuses 100_$i$, 200_$i$, 300_$i$, 400_$i$, and 500_$i$ may include hardware not shown in FIG. 12.

As shown in FIG. 12, the hardware configuration 10 that may be employed by the secure computation server apparatuses 100_$i$, 200_$i$, 300_$i$, 400_$i$, and 500_$i$ comprises a CPU (Central Processing Unit) 11, a primary storage device 12, an auxiliary storage device 13, and an IF (interface) part 14. These elements are connected to each other by, for instance, an internal bus.

The CPU 11 executes each instruction included in the secure computation program executed by the secure computation server apparatuses 100_$i$, 200_$i$, 300_$i$, 400_$i$, and 500_$i$. The primary storage device 12 is, for instance, a RAM (Random Access Memory) and temporarily stores various programs such as the secure computation program executed by the secure computation server apparatuses 100_$i$, 200_$i$, 300_$i$, 400_$i$, and 500_$i$ so that the CPU 11 can process the programs.

The auxiliary storage device 13 is, for instance, an HDD (Hard Disk Drive) and is capable of storing the various programs, such as the secure computation program executed by the secure computation server apparatuses 100_$i$, 200_$i$, 300_$i$, 400_$i$, and 500_$i$, in the medium to long term. The various programs such as the secure computation program may be provided as a program product stored in a non-transitory computer-readable storage medium. The auxiliary storage device 13 can be used to store the various programs such as the secure computation program stored in the non-transitory computer-readable storage medium in the medium to long term. The IF part 14 provides an interface to the input and output between the secure computation server apparatuses 100_$i$, 200_$i$, 300_$i$, 400_$i$, and 500_$i$.

The information processing apparatus employing the hardware configuration 10 described above achieves the functions of the secure computation server apparatuses 100_$i$, 200_$i$, 300_$i$, 400_$i$, and 500_$i$ by executing the secure computation method described above as a program.

Some or all of the example embodiments above can be described as (but not limited to) the following Supplementary Notes.

Supplementary Note 1

A secure computation system comprising at least three secure computation server apparatuses connected to each other via a network and referring to shares of an array element corresponding to an index in an array of shares for an input of shares representing the index, wherein
each of the secure computation server apparatuses comprises:
a discriminant share generation part that computes discriminant shares configured so that the index relating to the input corresponds to a specific value from the shares representing the index relating to the input and possible combinations of index shares of the array;
a combination configuration part that configures a combination of shares of an element in the array and the discriminant shares for all possible combinations of indices of the array;
a shuffle part that shuffles the combinations;
a reconstruction part that reconstructs the discriminant shares in the shuffled combinations; and
a selection part that selects shares of an element in the array in the combinations where the reconstructed value is the specific value.

Supplementary Note 2

The secure computation system according to Supplementary Note 1, wherein the discriminant share generation part computes the discriminant shares after converting the shares representing the index relating to the input and possible index shares into binary shares.

Supplementary Note 3

The secure computation system according to Supplementary Note 2, wherein the discriminant share generation part computes the discriminant shares using exclusive OR on the shares representing the index relating to the input and possible index shares, which have been converted into binary shares.

Supplementary Note 4

The secure computation system according to Supplementary Note 2 or 3 comprising N secure computation server apparatuses and performing secure computation using a (t+1, N)-additive secret sharing scheme.

Supplementary Note 5

The secure computation system according to Supplementary Note 1, wherein the discriminant share generation part computes the discriminant shares using the arithmetic difference between the shares representing the index relating to the input and possible index shares.

Supplementary Note 6

The secure computation system according to Supplementary Note wherein the discriminant share generation part computes the discriminant shares by multiplying the arithmetic difference by a non-zero random number.

Supplementary Note 7

The secure computation system according to Supplementary Note or 6 comprising N secure computation server apparatuses and performing secure computation using a (t+1, N)-Shamir's secret sharing scheme.

Supplementary Note 8

A secure computation server apparatus out of at least three secure computation server apparatuses connected to each other via a network in order to refer to shares of an array element corresponding to an index in an array of shares for an input of shares representing the index, the secure computation server apparatus including:
  a discriminant share generation part that computes discriminant shares configured so that the index relating to the input corresponds to a specific value from the shares representing the index relating to the input and possible combinations of index shares of the array;
  a combination configuration part that configures a combination of shares of an element in the array and the discriminant shares for all possible combinations of indices of the array;
  a shuffle part that shuffles the combinations;
  a reconstruction part that reconstructs the discriminant shares in the shuffled combinations; and
  a selection part that selects shares of an element in the array in the combinations where the reconstructed value is the specific value.

Supplementary Note 9

A secure computation method comprising at least three secure computation server apparatuses connected to each other via a network and referring to shares of an array element corresponding to an index in an array of shares for an input of shares representing the index, wherein
  each of the secure computation server apparatuses performs:
  computing discriminant shares configured so that the index relating to the input corresponds to a specific value from the shares representing the index relating to the input and possible combinations of index shares of the array;
  configuring a combination of shares of an element in the array and the discriminant shares for all possible combinations of indices of the array;
  shuffling the combinations;
  reconstructing the discriminant shares in the shuffled combinations; and
  selecting shares of an element in the array in the combinations where the reconstructed value is the specific value.

Supplementary Note 10

A secure computation program causing at least three secure computation server apparatuses connected to each other via a network to refer to shares of an array element corresponding to an index in an array of shares for an input of shares representing the index, the secure computation program including processes of:
  computing discriminant shares configured so that the index relating to the input corresponds to a specific value from the shares representing the index relating to the input and possible combinations of index shares of the array;
  configuring a combination of shares of an element in the array and the discriminant shares for all possible combinations of indices of the array;
  shuffling the combinations;
  reconstructing the discriminant shares in the shuffled combinations; and
  selecting shares of an element in the array in the combinations where the reconstructed value is the specific value.

Further, the disclosure of Non-Patent Literature cited above is incorporated herein in its entirety by reference thereto. It is to be noted that it is possible to modify or adjust the example embodiments or examples within the scope of the whole disclosure of the present invention (including the Claims) and based on the basic technical concept thereof. Further, it is possible to variously combine or select (or partially omit) a wide variety of the disclosed elements (including the individual elements of the individual claims, the individual elements of the individual example embodiments or examples, and the individual elements of the individual figures) within the scope of the whole disclosure of the present invention. That is, it is self-explanatory that the present invention includes any types of variations and modifications to be done by a skilled person according to the whole disclosure including the Claims and the technical concept of the present invention. Particularly, any numerical ranges disclosed herein should be interpreted that any intermediate values or subranges falling within the disclosed ranges are also concretely disclosed even without specific recital thereof. In addition, using some or all of the disclosed matters in the literature cited above as necessary, in combination with the matters described herein, as part of the disclosure of the present invention in accordance with the object of the present invention shall be considered to be included in the disclosed matters of the present application.

REFERENCE SIGNS LIST 100, 200, 300, 400, 500: secure computation system
100_i, 200_i, 300_i, 400_i, 500_i: secure computation server apparatus
101_i, 201_i, 301_i, 401_i, 501_i: discriminant share generation part
102_i, 202_i, 302_i, 402_i, 502_i: combination configuration part
103_i, 203_i, 303_i, 403_i, 503_i: shuffle part
104_i, 204_i, 304_i, 404_i, 504_i: reconstruction part
105_i, 205_i, 305_i, 405_i, 505_i: selection part
306_i, 506_i: non-zero random number generation part hardware configuration
11: CPU (Central Processing Unit)
12: primary storage device
13: auxiliary storage device
14: IF (interface) part

The invention claimed is:

1. A secure computation system comprising at least three secure computation server apparatuses connected to each other via a network and referring to shares of an array element corresponding to an index in an array of shares for an input of shares representing the index, wherein
each of the secure computation server apparatuses comprises:
a memory storing instructions;
a processor, which based on executing the instructions, is configured to:
compute discriminant shares configured so that the index relating to the input corresponds to a specific value from the shares representing the index relating to the input and possible combinations of index shares of the array;
configure a combination of shares of an element in the array and the discriminant shares for all possible combinations of indices of the array;
shuffle the combinations;
reconstruct the discriminant shares in the shuffled combinations; and
select shares of an element in the array in the combinations where the reconstructed value is the specific value.

2. The secure computation system according to claim 1, wherein the processor is further configured to compute the discriminant shares after converting the shares representing the index relating to the input and possible index shares into binary shares.

3. The secure computation system according to claim 2, wherein the processor is further configured to compute the discriminant shares using exclusive OR on the shares representing the index relating to the input and possible index shares, which have been converted into binary shares.

4. The secure computation system according to claim 2 comprising N secure computation server apparatuses and performing secure computation using a (t+1, N)-additive secret sharing scheme.

5. The secure computation system according to claim 1, wherein the processor is further configured to compute the discriminant shares using the arithmetic difference between the shares representing the index relating to the input and possible index shares.

6. The secure computation system according to claim 5, wherein the processor is further configured to compute the discriminant shares by multiplying the arithmetic difference by a non-zero random number.

7. The secure computation system according to claim 5 comprising N secure computation server apparatuses and performing secure computation using a (t+1, N)-Shamir's secret sharing scheme.

8. A secure computation server apparatus out of at least three secure computation server apparatuses connected to each other via a network in order to refer to shares of an array element corresponding to an index in an array of shares for an input of shares representing the index, the secure computation server apparatus including:
a memory storing instructions; and
a processor, which based on executing the instruction, is configured to:
compute discriminant shares configured so that the index relating to the input corresponds to a specific value from the shares representing the index relating to the input and possible combinations of index shares of the array;
configure a combination of shares of an element in the array and the discriminant shares for all possible combinations of indices of the array;
shuffle the combinations;
reconstruct the discriminant shares in the shuffled combinations; and
select shares of an element in the array in the combinations where the reconstructed value is the specific value.

9. The secure computation server apparatus according to claim 8, wherein the processor is further configured to compute the discriminant shares after converting the shares representing the index relating to the input and possible index shares into binary shares.

10. The secure computation server apparatus according to claim 9, wherein the processor is further configured to compute the discriminant shares using exclusive OR on the shares representing the index relating to the input and possible index shares, which have been converted into binary shares.

11. The secure computation server apparatus according to claim 9, wherein the secure computation server apparatus is one of N secure computation server apparatuses and performs secure computation using a (t+1, N)-additive secret sharing scheme.

12. The secure computation server apparatus according to claim 8, wherein the processor is further configured to compute the discriminant shares using the arithmetic difference between the shares representing the index relating to the input and possible index shares.

13. The secure computation server apparatus according to claim 12, wherein the processor is further configured to compute the discriminant shares by multiplying the arithmetic difference by a non-zero random number.

14. The secure computation server apparatus according to claim 12, wherein the secure computation server apparatus is one of N secure computation server apparatuses and performs secure computation using a (t+1, N)-Shamir's secret sharing scheme.

15. A secure computation method comprising at least three secure computation server apparatuses connected to each other via a network and referring to shares of an array element corresponding to an index in an array of shares for an input of shares representing the index, wherein
each of the secure computation server apparatuses performs:

computing discriminant shares configured so that the index relating to the input corresponds to a specific value from the shares representing the index relating to the input and possible combinations of index shares of the array;

configuring a combination of shares of an element in the array and the discriminant shares for all possible combinations of indices of the array;

shuffling the combinations;

reconstructing the discriminant shares in the shuffled combinations; and selecting shares of an element in the array in the combinations where the reconstructed value is the specific value.

16. The secure computation method according to claim 15, wherein each of the secure computation server apparatuses performs:

computing the discriminant shares after converting the shares representing the index relating to the input and possible index shares into binary shares.

17. The secure computation method according to claim 16, wherein each of the secure computation server apparatuses performs:

computing the discriminant shares using exclusive OR on the shares representing the index relating to the input and possible index shares, which have been converted into binary shares.

18. The secure computation method according to claim 15, wherein each of the secure computation server apparatuses performs:

computing the discriminant shares using the arithmetic difference between the shares representing the index relating to the input and possible index shares.

19. The secure computation method according to claim 18, wherein each of the secure computation server apparatuses performs:

computing the discriminant shares by multiplying the arithmetic difference by a non-zero random number.

20. A non-transient computer readable medium storing a secure computation program causing at least three secure computation server apparatuses connected to each other via a network to refer to shares of an array element corresponding to an index in an array of shares for an input of shares representing the index, the secure computation program including processes of:

computing discriminant shares configured so that the index relating to the input corresponds to a specific value from the shares representing the index relating to the input and possible combinations of index shares of the array;

configuring a combination of shares of an element in the array and the discriminant shares for all possible combinations of indices of the array;

shuffling the combinations;

reconstructing the discriminant shares in the shuffled combinations; and selecting shares of an element in the array in the combinations where the reconstructed value is the specific value.

* * * * *